United States Patent
Nilsson et al.

(10) Patent No.: US 11,444,674 B2
(45) Date of Patent: Sep. 13, 2022

(54) PRECODING IN A MULTI-USER MULTIPLE-INPUT MULTIPLE-OUTPUT WIRELESS COMMUNICATION SYSTEM

(71) Applicant: Telefonaktiebolaget LM Ericsson (publ), Stockholm (SE)

(72) Inventors: Andreas Nilsson, Gothenburg (SE); Sebastian Faxér, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 101 days.

(21) Appl. No.: 16/637,809

(22) PCT Filed: Aug. 8, 2018

(86) PCT No.: PCT/EP2018/071502
§ 371 (c)(1),
(2) Date: Feb. 10, 2020

(87) PCT Pub. No.: WO2019/030281
PCT Pub. Date: Feb. 14, 2019

(65) Prior Publication Data
US 2020/0244335 A1 Jul. 30, 2020

Related U.S. Application Data

(60) Provisional application No. 62/544,280, filed on Aug. 11, 2017.

(51) Int. Cl.
*H04B 7/06* (2006.01)
*H04B 7/0452* (2017.01)
*H04B 7/08* (2006.01)
*H04L 5/00* (2006.01)
*H04L 5/14* (2006.01)

(52) U.S. Cl.
CPC ......... *H04B 7/0695* (2013.01); *H04B 7/0452* (2013.01); *H04B 7/0626* (2013.01);
(Continued)

(58) Field of Classification Search
CPC .... H04B 7/0695; H04B 7/0452; H04B 7/086; H04B 7/0626; H04B 7/088; H04L 5/0051; H04L 5/1469
See application file for complete search history.

(56) References Cited

U.S. PATENT DOCUMENTS

| | | | |
|---|---|---|---|
| 2011/0009105 A1* | 1/2011 | Lee | H04B 7/0695 455/418 |
| 2012/0188962 A1* | 7/2012 | Gao | H04B 7/0621 370/328 |

(Continued)

FOREIGN PATENT DOCUMENTS

| | | | | |
|---|---|---|---|---|
| CN | 103475397 A | * | 12/2013 | |
| CN | 110662301 A | * | 1/2020 | ........... H04B 7/0404 |

(Continued)

OTHER PUBLICATIONS

Unknown, Author, "Beam determination for non-codebook based transmission for uplink", 3GPP TSG RAN WG1 NR Ad-Hoc Meeting; R1-1711074; Qingdao, China, Jun. 16-20, 2017, pp. 1-3.

(Continued)

*Primary Examiner* — Deepa Belur
(74) *Attorney, Agent, or Firm* — Murphy, Bilak & Homiller, PLLC

(57) ABSTRACT

A radio network node (12) is configured for use in a multi-user multiple-input multiple-output (MU-MIMO) wireless communication system (10). The radio network node (12) in this regard is configured to precode a downlink reference signal (22) to suppress the downlink reference signal (22) in a certain direction (D1) that is subject to interference between MU-MIMO uplink transmissions received in the certain direction from different wireless devices (14A, 14B). The radio network node (12) is further configured to transmit the precoded downlink reference signal (22) to at least a first one (14A) of the wireless (Continued)

devices. The radio network node (12) in some embodiments is also configured to transmit signaling (30) indicating that the precoded downlink reference signal (22) is usable by the first wireless device (14A) to derive a non-codebook based precoding of an uplink signal transmitted by the first wireless device (14A).

20 Claims, 9 Drawing Sheets

(52) U.S. Cl.
CPC ............ *H04B 7/086* (2013.01); *H04B 7/088* (2013.01); *H04L 5/0051* (2013.01); *H04L 5/1469* (2013.01)

(56) References Cited

U.S. PATENT DOCUMENTS

2013/0278463 A1* 10/2013 Nilsson .................. G01S 3/043
342/417

2014/0094188 A1* 4/2014 Kazmi .................. H04W 4/023
455/456.1

FOREIGN PATENT DOCUMENTS

| EP | 3242454 A1 | | 11/2017 |
|---|---|---|---|
| EP | 3280221 A1 | | 2/2018 |
| JP | 2010278809 A | * | 12/2010 |
| WO | 2010088828 A1 | | 8/2010 |
| WO | 2016119255 A1 | | 8/2016 |
| WO | 2016155502 A1 | | 10/2016 |

OTHER PUBLICATIONS

Unknown, Author, "UL beam management", 3GPP TSG RAN WG1 NR Ad-Hoc#2; R1-1710653; Qingdao, China, Jun. 27-30, 2017, pp. 1-5.

Intel Corporation, "On non-codebook Based UL Transmission", 3GPP TSG RAN WG1 NR Ad Hoc Meeting, R1-1710519, Qingdao, China, Jun. 27-30, 2017, 1-4.

* cited by examiner

PRECODING IN A MULTI-USER MULTIPLE-INPUT MULTIPLE-OUTPUT WIRELESS COMMUNICATION SYSTEM

BACKGROUND

A Multiple-Input Multiple-Output (MIMO) wireless communication system exploits the spatial dimension of the communication channel to send multiple information-carrying signals in parallel on at least partly overlapping time, frequency, and code resources. When applied in the uplink (UL) across multiple users, for example, multi-user MIMO (MU-MIMO) allows signals from multiple different wireless devices to be sent in the UL and separated by multiantenna processing in the radio access network. Each wireless device may precode its uplink signals to adapt the phase and amplitudes of the signals to better fit the current channel conditions and thereby realize significant performance gains.

Uplink MU-MIMO proves complicated in some contexts, though. For example, in a non-codebook based precoding approach, each wireless device derives its own precoding to apply in the uplink, rather than the precoding being selected from a predefined codebook of possible precodings. With each device free to independently determine its own precoding, each device may "greedily" apply whatever precoding maximizes its own data rate, without accounting for the interference that the applied precoding may introduce to other devices' transmissions.

SUMMARY

One or more embodiments herein precode a downlink reference signal, usable by a wireless device for deriving uplink precoding, in a way that accounts for (e.g., mitigates) interference between MU-MIMO uplink transmissions. Some embodiments for example precode the downlink reference signal to suppress the signal in a certain direction that is subject to interference between MU-MIMO uplink transmissions received in the certain direction. When the precoded downlink reference signal is used by a wireless device for deriving uplink precoding, such suppression may for instance effectively steer the device away from uplink precoding that causes its uplink transmission to be received in that certain direction. This in turn may reduce interference between MU-MIMO uplink transmissions and improve system performance (e.g., in terms of received mutual information).

More particularly, embodiments herein include a method performed by a radio network node configured for use in a multi-user multiple-input multiple-output (MU-MIMO) wireless communication system. The method comprises precoding a downlink reference signal to suppress the downlink reference signal in a certain direction that is subject to interference between MU-MIMO uplink transmissions received in the certain direction from different wireless devices. The method may also include transmitting the precoded downlink reference signal to at least a first one of the wireless devices. The method may further include transmitting signaling indicating that the precoded downlink reference signal is usable by the first wireless device to derive a non-codebook based precoding of an uplink signal transmitted by the first wireless device.

In some embodiments, for example, the precoded downlink reference signal may be transmitted on a downlink antenna port and the signalling indicates that the downlink antenna port is quasi co-located with an uplink antenna port on which a precoded uplink signal is transmittable by the first wireless device.

Alternatively or additionally, the uplink signal may be an uplink reference signal and the method may further comprise receiving, on a reference signal resource, the uplink reference signal as precoded by the first wireless device. In this case, the method may also comprise selecting, from among one or more reference signal resources on which precoded uplink reference signals from the first wireless device are received, one or more reference signal resources that the first wireless device is to use for uplink transmission, and transmitting signaling to the first wireless device instructing the first wireless device to use the one or more selected reference signal resources for uplink transmission.

In some embodiments, the precoding comprises precoding the downlink reference signal to be transmitted on a beam that has a null in the certain direction. Alternatively, the precoding may comprise precoding the downlink reference signal to be transmitted on one or more orthogonal beams that excludes a beam pointing in the certain direction. In this latter case, the method may comprise mapping the certain direction to an orthogonal beam in a set of multiple possible orthogonal beams and determining the one or more orthogonal beams on which the downlink reference signal is to be transmitted as excluding the orthogonal beam to which the certain direction is mapped.

In any of the above embodiments, the method may further comprise receiving uplink reference signals from the different wireless devices and determining the certain direction by estimating respective directions of arrival of the uplink reference signals. In some embodiments, for instance, the uplink reference signals are non-precoded uplink reference signals. Alternatively or additionally, the uplink reference signals may be sounding reference signals. Regardless, estimating respective directions of arrival of the uplink reference signals may comprise estimating respective directions of arrival of the uplink reference signals associated with the strongest received power.

Alternatively, the method may comprise calculating respective covariance matrices for the different wireless devices and determining the certain direction from the calculated covariance matrices.

In still other embodiments, the method may comprise receiving uplink reference signals from the different wireless devices and determining precoding weights for precoding the downlink reference signal, based on explicit uplink channel estimates obtained from uplink reference signals. In some embodiments, for example, determining the precoding weights comprises performing a regularized inverse of the sum of instantaneous channel correlation of channels of the wireless devices.

In any of the above embodiments, the downlink reference signal may be a channel state information reference signal, CSI-RS.

In some embodiments, the method may comprise transmitting the downlink reference signal to each of the wireless devices on a downlink antenna port, and transmitting signaling indicating that the downlink antenna port is quasi co-located with an uplink antenna port of each of the wireless devices.

In any of the above embodiments, the MU-MIMO wireless communication system may be a time division duplex (TDD) system.

Still other embodiments herein include corresponding apparatus, computer programs, and carriers (e.g., non-transitory computer-readable storage mediums).

For example, embodiments herein also include a radio network node configured for use in a multi-user multiple-input multiple-output (MU-MIMO) wireless communication system. The radio network node is configured to precode a downlink reference signal to suppress the downlink reference signal in a certain direction that is subject to interference between MU-MIMO uplink transmissions received in the certain direction from different wireless devices. The radio network node may also be configured to transmit the precoded downlink reference signal to at least a first one of the wireless devices, and transmit signaling indicating that the precoded downlink reference signal is usable by the first wireless device to derive a precoding of an uplink signal transmitted by the first wireless device.

Further, embodiments herein also include a radio network node configured for use in a multi-user multiple-input multiple-output (MU-MIMO) wireless communication system. The radio network node comprises processing circuitry and a memory. The memory contains instructions executable by the processing circuitry whereby the radio network node is configured to precode a downlink reference signal to suppress the downlink reference signal in a certain direction that is subject to interference between MU-MIMO uplink transmissions received in the certain direction from different wireless devices. By execution of the instructions, the radio network node is further configured to transmit the precoded downlink reference signal to at least a first one of the wireless devices and to transmit signaling indicating that the precoded downlink reference signal is usable by the first wireless device to derive a non-codebook based precoding of an uplink reference signal transmitted by the first wireless device.

The memory of the radio network node may also contain instructions executable by the processing circuitry whereby the radio network node is configured to perform the method of any of embodiments described in this disclosure.

Yet further, embodiments herein also include a radio network node configured for use in a multi-user multiple-input multiple-output (MU-MIMO) wireless communication system. The radio network node comprises a precoding module for precoding a downlink reference signal to suppress the downlink reference signal in a certain direction that is subject to interference between MU-MIMO uplink transmissions received in the certain direction from different wireless devices. The radio network node also comprises a transmitting module for transmitting the precoded downlink reference signal to at least a first one of the wireless devices, and for transmitting signaling indicating that the precoded downlink reference signal is usable by the first wireless device to derive a non-codebook based precoding of an uplink reference signal transmitted by the first wireless device.

The radio network node may also comprise one or more modules for performing the method of any of embodiments described in this disclosure.

Other embodiments herein include a computer program comprising instructions which, when executed by at least one processor of a radio network node, causes the radio network node to carry out the method of any of the above embodiments. Still other embodiments include a carrier containing such a computer program. The carrier may be one of an electronic signal, optical signal, radio signal, or computer readable storage medium.

BRIEF DESCRIPTION OF THE DRAWINGS

FIG. 9 is a block diagram of a radio network node according to some embodiments.

FIG. 10 is a block diagram of a radio network node according to other embodiments.

DETAILED DESCRIPTION

Figure 1:
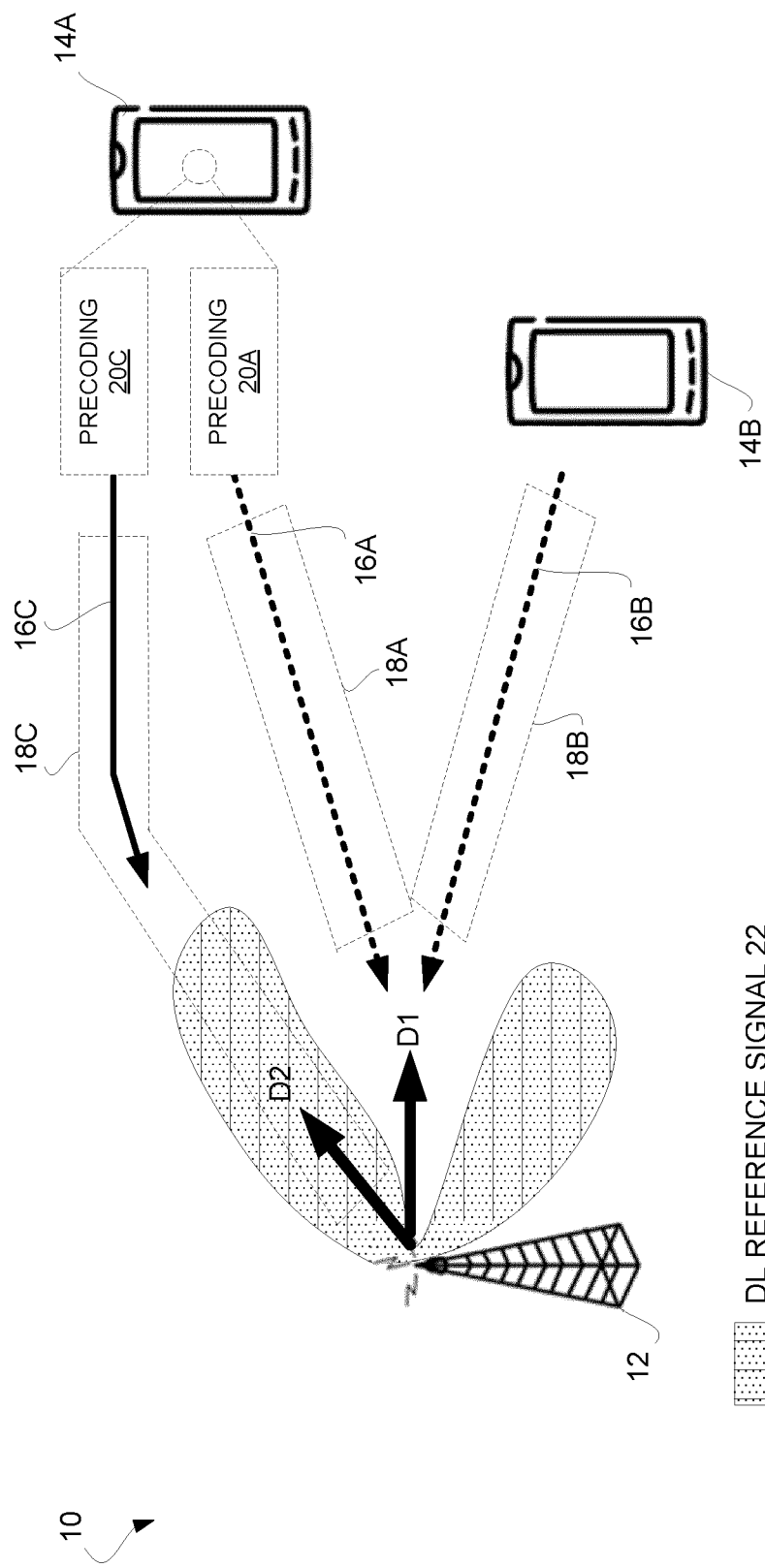
FIG. 1 is a block diagram of a wireless communication system according to some embodiments.

FIG. 1 illustrates a multi-user multiple-input multiple-output (MU-MIMO) wireless communication system 10 according to some embodiments. The system 10 may for example operate according to time division duplexing (TDD), e.g., such that reciprocity between uplink and downlink may be assumed. In any event, the system 10 as shown includes a radio network node 12 (e.g., a base station) configured to serve multiple wireless devices (e.g., user equipments, UEs) shown as including at least a first wireless device 14A and a second wireless device 14B.

The radio network node 12 in this regard is configured to receive MU-MIMO transmissions from the different wireless devices 14A, 14B, i.e., on at least partly overlapping time, frequency, and code resources. However, MU-MIMO transmissions 16A, 16B that are or would be received in a certain direction D1 from the different wireless devices 14A, 14B over radio channels 18A, 18B are subject to interference with one another, e.g., inter-user interference that is strongly correlated. That is, a MU-MIMO transmission 16A that has been or would be received in the certain direction D1 from the first wireless device 14A is subject to interference with a MU-MIMO transmission 16B that also has been or would be received in the certain direction D1 from the second wireless device 14B, such that the MU-MIMO transmissions 16A, 16B may not be properly detectable by the radio network node 12.

According to some embodiments, the radio network node 12 effectively steers at least the first wireless device 14A (and optionally also the second wireless device 14B) away from performing an MU-MIMO uplink transmission that the radio network node 12 would receive in the certain direction D1, e.g., in favor of at least the first wireless device 14A performing an MU-MIMO uplink transmission that the radio network node 12 would receive in a different direction. As shown in FIG. 1, for instance, the radio network node 12 may effectively steer the first wireless device 14A away from performing an MU-MIMO uplink transmission 16A that the radio network node 12 would have received in the direction D1 subject to interference, in favor of the first wireless device 14A instead performing an MU-MIMO uplink transmission 16C that the radio network node 12 receives in a different direction D2 (over radio channel 18C). With at least the first wireless device 14A steered in this way, interference between MU-MIMO uplink transmissions of the devices 14A, 14B is reduced or even eliminated. This may in turn increase the mutual information that the radio network node 12 receives from those MU-MIMO uplink transmissions and improve overall system performance.

To effectively perform this sort of steering, the radio network node 12 in some embodiments controls, governs, or otherwise influences non-codebook based uplink precoding (e.g., beamforming) that at least the first wireless device 14A applies for MU-MIMO uplink transmission. For example, the radio network node 12 may steer the first wireless device 14A away from performing the MU-MIMO uplink transmission 16A resulting from applying certain non-codebook based uplink precoding 20A, by controlling, governing, or otherwise influencing the first wireless device 14A to disfavor and refrain from applying uplink precoding 20A. This may mean that the first wireless device 14A instead favors and applies uplink precoding 20C to perform the MU-MIMO uplink transmission 16C.

More particularly, especially in embodiments where reciprocity between uplink and downlink may be assumed, the non-codebook based uplink precoding that at least the first wireless device 14A applies for MU-MIMO uplink transmission may be derived (at least indirectly) using a downlink reference signal 22 transmitted by the radio network node 12 (e.g., a channel state information reference signal, CSI-RS). Accordingly, the radio network node 12 in some embodiments precodes (e.g., beamforms) and transmits the downlink reference signal 22 in such a way that causes the first wireless device 14A to disfavor uplink precoding 20A and/or favor uplink precoding 20C, so as to effectively steer the first wireless device 14A away from performing MU-MIMO uplink transmission 16A in favor of MU-MIMO uplink transmission 16C.

FIG. 1 in particular shows that the radio network node 12 precodes the downlink reference signal 22 to suppress the signal 22 in the certain direction D1 that is subject to interference between MU-MIMO uplink transmissions received in the certain direction D1. At least in embodiments where radio channels 18A, 18C are assumed by the wireless device 14A to be reciprocal in the uplink and downlink, this suppression may mean that the first wireless device 14A perceives the downlink reference signal 22 as relatively weak over radio channel 18A and/or as relatively strong over radio channel 18C. The first wireless device 14A may then correspondingly disfavor applying uplink precoding 20A for performing MU-MIMO uplink transmission 16A over the relatively weaker radio channel 18A and/or favor applying uplink precoding 20C for performing MU-MIMO uplink transmission 16C over the relatively stronger radio channel 18C.

Figure 2:
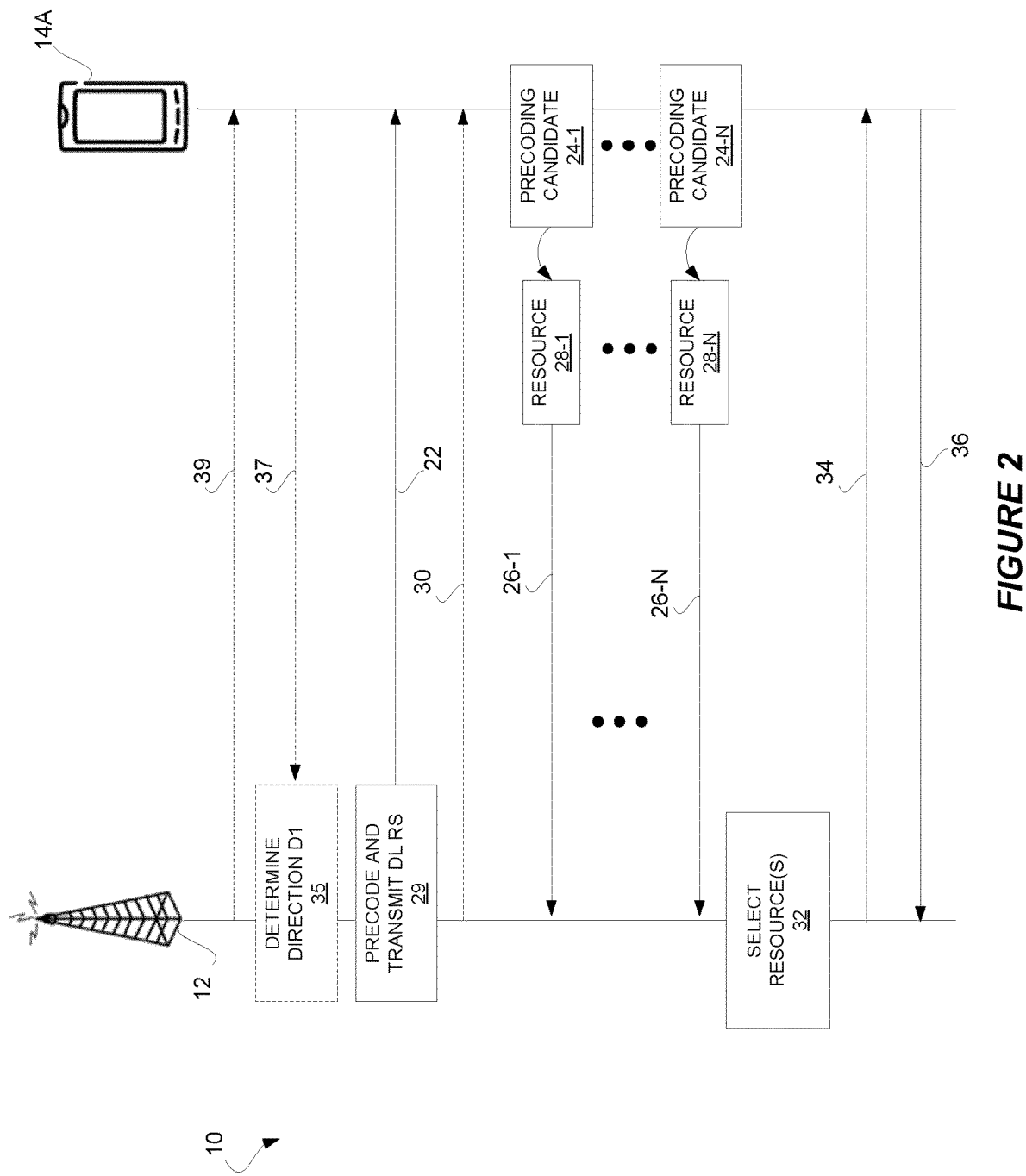
FIG. 2 is a call flow diagram for processing performed by a radio network node according to some embodiments.

In some embodiments, the radio network node's precoding of the downlink reference signal 22 influences the first wireless device's uplink precoding in this way by influencing which uplink precoding candidates the first wireless device 14A considers for MU-MIMO uplink transmission precoding. For example, the radio network node's precoding of the downlink reference signal 22 may cause the first wireless device 14A to exclude uplink precoding 20A from consideration as a candidate for MU-MIMO uplink transmission precoding. FIG. 2 illustrates one example of this.

As shown in FIG. 2, the radio network node 12 precodes and transmits (Block 29) the downlink reference signal 22 for reception by the first wireless device 14A. The first wireless device 14A uses the downlink reference signal 22 to determine a set of non-codebook based uplink precoding candidates 24-1, . . . 24-N for MU-MIMO uplink transmission. The first wireless device 14A may for instance measure the downlink reference signal 22 to obtain a downlink channel estimate. Based on this downlink channel estimate and an assumption of reciprocity between uplink and downlink, the first wireless device 14A may convert the downlink channel estimate into an uplink channel estimate and use the uplink channel estimate to determine the set of uplink precoding candidates 24-1, . . . 24-N. The first wireless device 14A may for instance perform a singular value decomposition (SVD) of the uplink channel estimate to derive the uplink precoding candidates. No matter the particular implementation, though, the radio network node's suppression of the downlink reference signal 22 in the certain direction D1 means that the set of uplink precoding candidates 24-1, . . . 24-N may exclude uplink precoding 20A associated with that direction D1.

In some embodiments, although the first wireless device 14A itself derives the set of non-codebook based uplink precoding candidates, the radio network node 12 effectively selects and instructs which of those candidates the first wireless device 14A is to use for MU-MIMO uplink transmission precoding. As shown in FIG. 2, for instance, the first wireless device 14A applies the uplink precoding candidates 24-1, . . . 24-N to respective uplink reference signal transmissions 26-1, . . . 26-N performed on associated reference signal resources 28-1, . . . 28-N (e.g., sounding reference signal, SRS, transmissions performed on associated SRS resources).

The first wireless device 14A may do so for instance based on receiving signaling 30 from the radio network node 12. The signaling 30 may indicate that the downlink reference signal 22 is usable by the first wireless device 14A to derive non-codebook based uplink precoding, e.g., of an uplink transmission or an uplink signal, such as an uplink reference signal. In some embodiments, for example, the downlink reference signal 22 is transmitted on a certain downlink antenna port and the signaling 30 indicates that the certain downlink antenna port is quasi co-located with an uplink antenna port of the first wireless device 14A, e.g., so as to indicate a reciprocal spatial uplink-downlink relation between the uplink and downlink antenna ports. The uplink antenna port may be for instance an antenna port on which a precoded uplink reference signal is transmittable by the first wireless device 14A. The antenna ports may be quasi co-located in the sense that at least some large-scale properties of the uplink channel over which a symbol on the uplink antenna port is conveyed can be inferred from the downlink channel over which a symbol on the downlink antenna port is conveyed. The large-scale properties may include for example one or more of delay spread, Doppler spread, Doppler shift, average gain, average delay and particularly spatial transmit or receive correlation matrix, etc. Thus, a spatial reciprocal quasi co-location relation may imply that the receive correlation matrix measured on a downlink antenna port is approximately the same as the transmit correlation matrix measured on an uplink antenna port.

In any event, the radio network node 12 correspondingly performs selection 32 of one or more of these reference signal resources 28-1, . . . 28-N, e.g., on which the strongest uplink reference signal transmissions 26-1, . . . 26-N are received. The radio network node 12 then transmits signaling 34 to the first wireless device 14A indicating the selected resource(s), e.g., as one or more resource indicators. In embodiments where the uplink reference signal transmissions comprise SRS, the signaling 34 may be embodied as one or more Sounding Reference Signal Resource Indicators, SRIs. Regardless, based on this signaling 34, the first wireless device 14A identifies the uplink precoding candidate(s) applied to uplink reference signal transmission(s) on the selected resource(s), and applies the identified precoding candidate(s) to MU-MIMO uplink transmission 36. With uplink precoding 20A excluded from the uplink precoding candidates, MU-MIMO uplink transmission 36 may be received by the radio network node 12 in a different direction (e.g., D2) than the direction D1 subject to interference with another MU-MIMO uplink transmission.

Figures 3A, 3B:
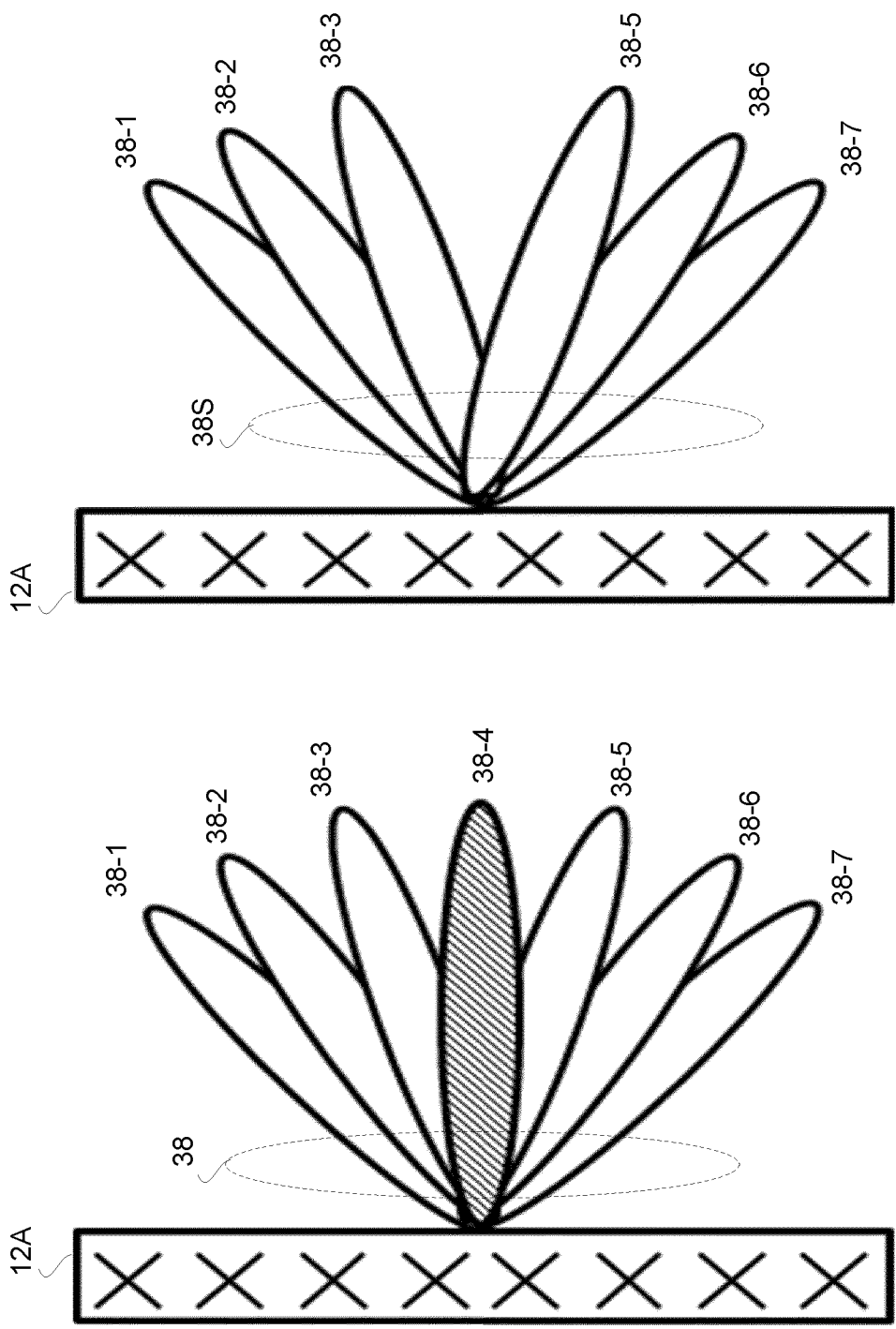
FIG. 3A is a block diagram showing a set of orthogonal beams from an antenna array according to some embodiments.
FIG. 3B is a block diagram showing a subset of the orthogonal beam set of FIG. 3A that excludes beams pointing in a certain direction according to some embodiments.

Note that the radio network node's precoding may suppress the downlink reference signal 22 in direction D1 in a relative sense by amplifying the downlink reference signal 22 to have power that is stronger in one or more other directions (e.g., D2) than in the direction D1 subject to interference. Alternatively or additionally, the radio network node's precoding may suppress the downlink reference signal 22 in direction D1 in an absolute sense. The radio network node 12 may for instance (substantially) null the downlink reference signal 22 in direction D1. In this respect, a beam with a null in the direction D1 may mean that the signal power in this direction D1 is essentially zero. Or, the radio network node 12 may transmit the downlink reference signal 22 on one or more orthogonal beam(s) that exclude a beam pointing in direction D1. FIGS. 3A-3B illustrate one example of this.

FIG. 3A in this regard shows the radio network node 12 with a transmit antenna array 12A. The radio network node 12 creates a set 38 of orthogonal beams 38-1, . . . 38-7 that spans the entire channel space by for instance taking the columns of a Discrete Fourier Transform (DFT) matrix $D_{N_{TX}}$, which is defined as $$[D_{N_{TX}}]_{k,l} = \frac{1}{\sqrt{N_{TX}}} e^{\frac{j2\pi kl}{N_{TX}}}.$$

The radio network node 12 then maps the direction D1 subject to interference to one of the orthogonal DFT beams, corresponding to a column of $D_{N_{TX}}$ shown as beam 38-4. As shown in FIG. 3B, the radio network node 12 correspondingly creates the precoding to transmit the downlink reference signal 20 on a subset 38S of the orthogonal beams that excludes the mapped beam 38-4. The radio network node 12 may for instance create precoding weights by taking a column subset of the DFT matrix $D_{N_{TX}}$, where the column subset excludes the column associated with the mapped beam 38-4.

In these and other embodiments, as part of or in order to suppress the downlink reference signal 22 in the direction D1 subject to MU-MIMO uplink transmission interference, the radio network node 12 may determine that certain direction D1 subject to interference, e.g., in Block 35 of FIG. 2. In such embodiments, the radio network node 12 may for instance receive uplink reference signals from the different wireless devices 14A, 14B, including for instance uplink reference signal 37 shown in FIG. 2. While in some embodiments the radio network node 12 receives these uplink reference signals without specifically soliciting them for purposes of determining the direction D1, in other embodiments the radio network node 12 may transmit signaling (e.g., signaling 39 in FIG. 2) that solicits or otherwise triggers transmission of the uplink reference signal(s). Regardless, the radio network node 12 may then estimate respective directions of arrival of the uplink reference signals, and determine the direction D1 as being an estimated direction of arrival common to the different wireless devices 14A, 14B, i.e., a direction in which an uplink reference signal is received from each of the devices 14A, 14B. Note in some embodiments, though, the radio network node 12 limits its consideration to just the uplink reference signals received or associated with the strongest received power. For example, the radio network node 12 may determine direction D1 by estimating the direction of arrival of the strongest paths of the wireless devices 14A, 14B. Such a limitation may in some circumstances improve the estimation quality.

Moreover, in some embodiments, the radio network node 12 determines the directions of arrival based on measurements of uplink reference signals (e.g., SRS) transmitted from the wireless devices 14A, 14B without precoding. In one embodiment, the radio network node 12 uses such non-precoded signals that are anyway transmitted from the wireless devices 14A, 14B, e.g., for a purpose other than direction of arrival estimation. For example, if the radio network node 12 is using reciprocity-based downlink transmission, the wireless devices 14A, 14B may occasionally transmit non-precoded SRS to sound the full channel. In another embodiment, the radio network node 12 triggers a dedicated uplink transmission of non-precoded SRS in order to attain direction of arrival estimations, e.g., by transmitting trigger signalling 39 in FIG. 2.

In still other embodiments, the radio network node 20 may calculate respective covariance matrices for the different wireless devices 14A, 14B and determine the certain direction D1 from the calculated covariance matrices, e.g., based on spectral decomposition of the covariance matrices. For instance, where $p(\phi) = a(\phi)^H R a(\phi)$ in which R is a channel covariance matrix and $a(\phi)$ is an array steering (DFT) vector at angle $\phi$, the radio network node 20 may identify spectral peaks in $p(\phi)$. Note in this regard $$\text{Note in this regard that} = \frac{1}{N} \sum_{n=1}^{N} H^H(n) H(n),$$

where H(n) represents the channel for resource element indices n in either time or frequency. In some embodiments, the radio network node 20 may calculate the channel covariance matrix on a relatively long-term fashion by averaging over time and/or frequency. Such calculations may be performed based for instance on measurement of any uplink signals (e.g., SRS) received from the different wireless devices 14A, 14B.

In still other embodiments, the radio network node 20 may receive uplink reference signals from the different wireless devices 14A, 14B and determine precoding weights for precoding the downlink reference signal 22, based on explicit uplink channel estimates obtained from the uplink reference signals. The explicit uplink channel estimates $H_j$ may for instance be obtained from non-precoded SRS transmissions for wireless devices j=1, . . . , $N_{UE}$ and used to determine the precoding of the downlink reference signal 22.

In some embodiments, for instance, the radio network node 20 generates, for the downlink reference signal 22, a precoding that has nulls in the direction D1 where both wireless devices' channels are strong by performing a regularized inverse of the sum of the instantaneous channel correlation of the wireless devices' channels. This summed matrix will have a spectral composition which is strong in those subspaces where the wireless devices' channels overlap. Inverting this matrix will attenuate the beam pattern in these channel subspaces (corresponding to the overlapping directions).

In one embodiment, for example, the precoding for the downlink reference signal 22 is determined by constructing a leakage matrix based on the explicit uplink channel estimates $H_j$, $j=1, \ldots, N_{UE}$. For instance, precoding weights F may be generated using the formula:

$$F = \left( \alpha \cdot I + \sum_{j=1}^{N_{UE}} H_j^H H_j \right)^{-1}$$

In this case, the downlink reference signal virtualization matrix F is a $N_{TX} \times N_{TX}$ matrix, where $N_{TX}$ is the number of transmit antennas at the radio network node 12 and a is a real-valued regularization constant. Each wireless device 14A, 14B will correspondingly estimate the effective precoded channel on the downlink reference signal 22 as:

$$H_j^{(eff)} = H_j \left( \alpha \cdot I + \sum_{j=1}^{N_{UE}} H_j^H H_j \right)^{-1}$$

which will be perceived as weak in the directions where the wireless devices' channels overlap. Thus, in this case, a $N_{TX}$ port downlink reference signal resource may be used.

Another way to accomplish this is to derive an overlapping channel subspace and construct a projection matrix that projects the precoder on the orthogonal complement of the subspace corresponding to the overlapping directions.

Note that, as suggested above, the radio network node 12 effectively steers the first wireless device 14A away from performing a MU-MIMO uplink transmission that the radio network node 12 would receive in the certain direction D1, and in some embodiments may also effectively steer one or more other wireless devices (e.g., device 14B) away from performing an MU-MIMO uplink transmission that the radio network node 12 would receive in the certain direction D1 as well. In these embodiments, the radio network node 12 may transmit the downlink reference signal 22 to each of the wireless devices 14A, 14B to be steered away from such MU-MIMO uplink transmissions received in direction D1. The radio network node 12 may further transmit signaling 30 to each of these wireless devices 14A, 14B indicating that the downlink reference signal 22 is usable by each of the wireless devices 14A, 14B to derive non-codebook based uplink precoding, e.g., of an uplink transmission or an uplink signal, such as an uplink reference signal.

In the following, the above described embodiments will be explained in more detail with respect to Uplink (UL) Multi-user MIMO (MU-MIMO) which is foreseen to be a key technical component in 5G. The purpose of MU-MIMO is to serve multiple UEs simultaneously in the same time, frequency, and code resources and in this way increase the capacity in the system. MU-MIMO may be hard to realize in reality, however, due to the dynamic behavior of the system and due to interference generated between the multiple simultaneously served UEs. Utilizing multiple antennas at the UE side, though, the inter-user interference can be mitigated and the MU-MIMO performance increased. Hence, proper beamforming settings at the UE largely can improve the performance for UL MU-MIMO.

Large parts of future New Radio, NR, networks may be deployed for TDD. One benefit with TDD (compared to Frequency Division Duplex, FDD) is that TDD enables reciprocity-based beamforming, which can be applied both at the radio network node 12 (i.e. for DL) and the wireless device 14A, 14B (i.e. for UL). Without loss of generality, the radio network node is called Transmission Radio Point, TRP, or gNodeB, gNB, and the wireless device 14A is called UE, in the following. For reciprocity-based DL transmission, the UE may transmit Sounding Reference Signals (SRSs) which the TRP will use to estimate the channel between the TRP and UE. The channel estimate will then be used at the TRP to find optimal precoding weights for the coming DL transmission, for example by performing a singular value decomposition (SVD) of the UL channel estimate. In similar way, CSI-RS may be used as a sounding signal in the downlink for reciprocity-based UL transmissions. In some embodiments herein, a TRP may indicate a quasi co-location (QCL) assumption to an earlier transmitted DL reference signal (e.g. CSI-RS) that a UE may use when determining UL precoding.

Codebook based UL beamforming will be explained in the following. Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO. In this regard, the transmitter and receiver can be embodied as the radio network node or the wireless device.

Figure 4:
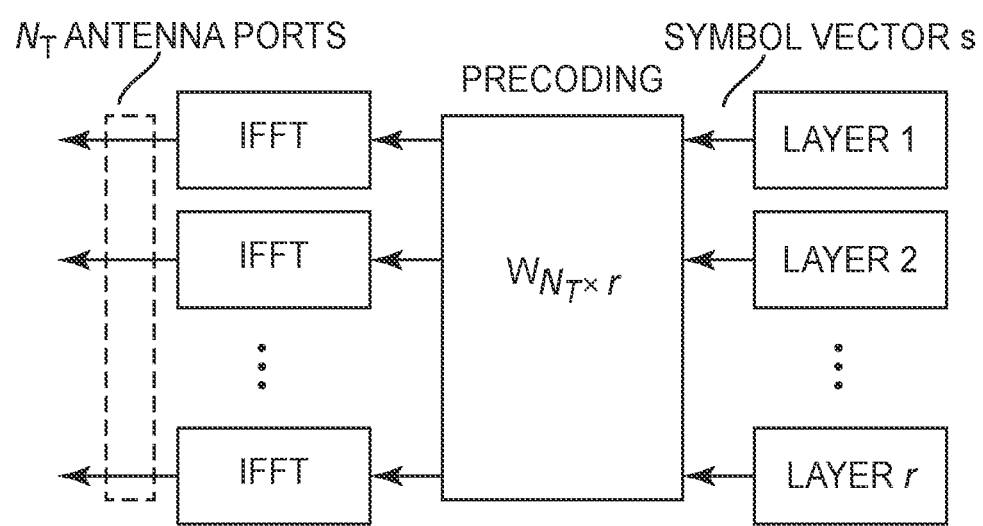
FIG. 4 is a block diagram of a process for performing precoding according to some embodiments.

The NR standard is currently being specified. A core component in NR is the support of MIMO antenna deployments and MIMO related techniques. It is expected that NR will support uplink MIMO with at least 4 layer spatial multiplexing using at least 4 antenna ports with channel dependent precoding. The spatial multiplexing mode is aimed for high data rates in favorable channel conditions. An illustration of the spatial multiplexing operation is provided in FIG. 4 for where cyclic prefix orthogonal frequency division multiplexing (CP-OFDM) is used on the uplink. FIG. 4 in this regard shows the transmission structure of precoded spatial multiplexing mode in NR.

As seen, the information carrying symbol vector s is multiplied by an $N_T \times r$ precoder matrix W, which serves to distribute the transmit energy in a subspace of the $N_T$ (corresponding to $N_T$ antenna ports) dimensional vector space. The precoder matrix represents a mathematical description of the precoding mentioned in FIGS. 1 and 2. The precoder matrix may be selected from a codebook of possible precoder matrices, and indicated by means of a transmit precoder matrix indicator (TPMI), which specifies a unique precoder matrix in the codebook for a given number of symbol streams. The r symbols in s each correspond to a layer and r is referred to as the transmission rank. In this way, spatial multiplexing is achieved since multiple symbols can be transmitted simultaneously over the same time/frequency resource element (TFRE). The number of symbols r is typically adapted to suit the current channel properties.

The received $N_R \times 1$ vector $y_n$ for a certain time-frequency resource (TFRE) on subcarrier n (or alternatively data TFRE number n) is thus modeled by $y_n = H_n W s_n + e_n$ where $e_n$ is a noise/interference vector obtained as realizations of a random process. The precoder W may be a wideband precoder, which is constant over frequency, or frequency selective.

The precoder matrix W is often chosen to match the characteristics of the $N_R \times N_T$ MIMO channel matrix $H_n$, resulting in so-called channel dependent precoding. This is also referred to as closed-loop precoding and essentially strives for focusing the transmit energy into a subspace which is strong in the sense of conveying much of the transmitted energy to the UE. In addition, the precoder matrix may also be selected to strive for orthogonalizing the channel, meaning that after proper linear equalization at the UE, the inter-layer interference is reduced.

One example method for a UE to select a precoder matrix W can be to select the $W_k$ that maximizes the Frobenius norm of the hypothesized equivalent channel:

$$\max_k \|\hat{H}_n W_k\|_F^2$$

where $\hat{H}_n$ is a channel estimate, possibly derived from CSI-RS as described herein, $W_k$ is a hypothesized precoder matrix with index k, and $\hat{H}_n W_k$ is the hypothesized equivalent channel.

In closed-loop precoding for the NR uplink, the TRP transmits, based on channel measurements in the reverse link (uplink direction), TPMI to the UE that the UE should use on its uplink antennas. The gNodeB configures the UE to transmit SRS according to the number of UE antennas it would like the UE to use for uplink transmission to enable the channel measurements. A single precoder that is supposed to cover a large bandwidth (wideband precoding) may be signaled. It may also be beneficial to match the frequency variations of the channel and instead feed back a frequency-selective precoding report, e.g. several precoders and/or several TPMIs, one per subband.

Other information than TPMI is generally used to determine the UL MIMO transmission state, such as SRS resource indicators (SRIs) as well as transmission rank indicator (TRIs). These parameters, as well as the modulation and coding state (MCS), and the uplink resources where the physical uplink shared channel (PUSCH) is to be transmitted, are also determined by channel measurements derived from SRS transmissions from the UE. The transmission rank, and thus the number of spatially multiplexed layers, is reflected in the number of columns of the precoder W. For efficient performance, it is important that a transmission rank that matches the channel properties is selected.

Non-codebook based UL transmission will be explained in the following. In addition to codebook-based UL transmission, NR will support a non-codebook based transmission mode, which is applicable when TX/RX reciprocity holds at the UE. In the codebook-based mode, as stated earlier, the UE transmits a non-precoded SRS to sound the uplink channel and the gNB determines a preferred precoder from the codebook based on the SRS channel estimates and instructs the UE to apply said precoder on the PUSCH transmission by means of a TPMI comprised in the UL grant.

For non-codebook based UL transmission, however, the UE itself derives/determines one or more precoder candidates and uses said precoder candidates to precode one or more SRS in one or more SRS resources. The gNB correspondingly determines one or more preferred SRS resource and instructs the UE to use the precoder(s) applied for precoding the one or more preferred SRS resources also for the PUSCH transmission. This instruction may be signaled in the form of one or more SRI(s) comprised in the downlink control information (DCI) carrying the UL grant, but may alternatively or additionally include TRI signaling.

For the UE to determine the UL precoder candidates, it needs to measure a DL reference signal, such as a CSI-RS in order to attain a DL channel estimate. Based on this DL channel estimate, and assuming TX/RX reciprocity holds, the UE in some embodiments herein converts the DL channel estimate into an UL channel estimate and uses the UL channel estimate to determine a set of UL precoder candidates, for instance by performing a singular value decomposition (SVD) of the UL channel estimate or by other established precoder determination methods. The gNB in some embodiments configures the UE, implicitly or explicitly, with which CSI-RS resource it can use to aid precoder candidate determination. This may be done by indicating that a certain CSI-RS resource is reciprocally spatially quasi co-located with the SRS resource(s) the UE is scheduled to use for UL sounding, for instance as a part of radio resource control (RRC) configuration. In one specific embodiment the CSI-RS used for UL channel estimation is indicated in a SRS-ResourceSet by associating the paramterer associatedCSI-RS with a NZP-CSI-RS-ResourceConfigID.

For reciprocity based UL transmission, one approach for the UE to determine UL precoder candidates based on a CSI-RS would maximize the user throughput for the subsequent UL transmission for that UE, for example by applying eigenbeamforming. However, when multiple UEs are scheduled for UL transmission simultaneously, i.e. UL MU-MIMO, eigenbeamforming being applied independently for respective UE may be sub-optimal for the total mutual information due to unmanaged inter-user interference. That is, under this approach, each UE would "greedily" determine UL precoder candidates that maximizes their own rate, without accounting for the interference it creates to other UEs transmissions.

According to some embodiments in line with the embodiments described above, the TRP beamforms the CSI-RS that should be used for UEs during reciprocity based UL MU-MIMO, such that the UE implicitly takes inter-user interference into account when designing the reciprocity based UL precoder. In some embodiments, for example, a method for determining reciprocity based UE precoding weights for UL MU-MIMO may include at least one of: (i) the TRP identifying directions where cancellation of inter-user interference will be difficult; (ii) the TRP beamforming CSI-RS based on the identified directions; and (iii) the UE using the beamformed CSI-RS as base for reciprocity based UL MU-MIMO transmissions. Regardless, with the precoding of the UE implicitly taking inter-user interference in to account when determining UL precoder during reciprocity based UL MU-MIMO transmissions, the inter-user interference may be reduced and the total UL MU-MIMO user-throughput improved.

Figure 5A:
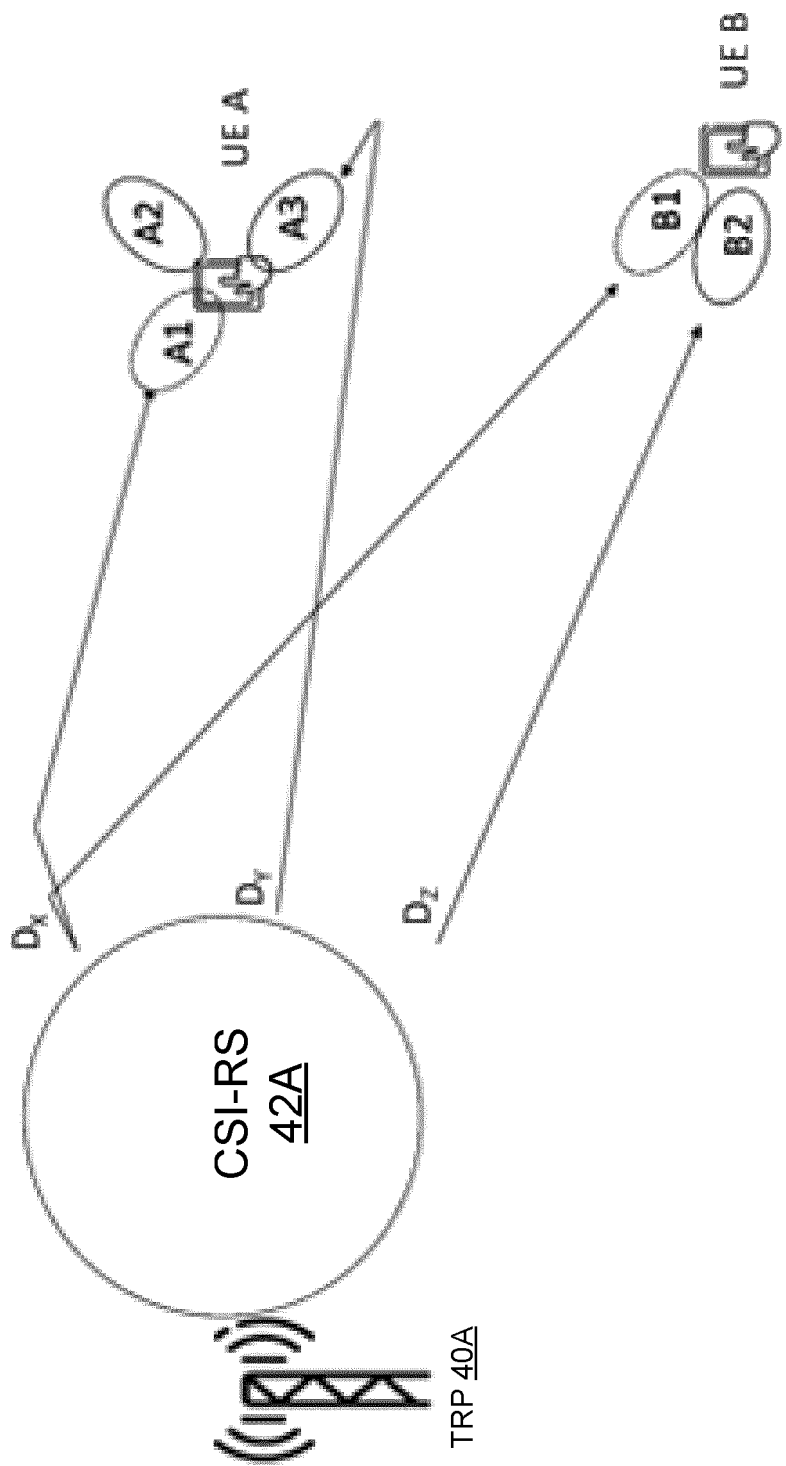
FIG. 5A is a block diagram of a TRP that transmits CSI-RS without regard to the resulting inter-user interference.

More particularly, FIG. 5A illustrates inter-user interference that may result absent the TRP beamforming the CSI-RS to account for that interference. In the example, one TRP 40A has scheduled two UEs (UE A and UE B) for reciprocity based UL MU-MIMO. UE A has two strong paths from two different UE TX beams (A1 & A3) which arrive at the TRP in two different directions Dx and Dy. In similar fashion, UE B has two strong paths from two UE TX beams (B1 & B2) which arrive at the TRP in two different directions Dx and Dz. In the example, the same CSI-RS 42A is assumed to be used to sound the channel for both UEs. Re-using the same CSI-RS for multiple UEs will save overhead signalling. In other embodiments not shown, though, instead of re-using the same CSI-RS for multiple UEs, different CSI-RS may be used for different UEs.

In any case, as shown in FIG. 5A, a wide TRP TX beam is used covering all the directions of the different paths (Dx, Dy and Dz). One risk with using such CSI-RS transmission 42A is that both UEs might create precoders focusing their energy towards the paths ending up in direction Dx at the TRP (for example using UE beams A1 and B1 at respective UEs A an B), which will generate strongly correlated inter-user interference between the two UL MU-MIMO transmissions. Such strongly correlated inter-user interference will be difficult to remove with realistic receiver implementations, such as an interference rejection combining (IRC) receiver filter, at the TRP, which in turn will reduce the UL signal-to-interference-plus-noise ratio (SINR) and throughput.

Figure 5B:
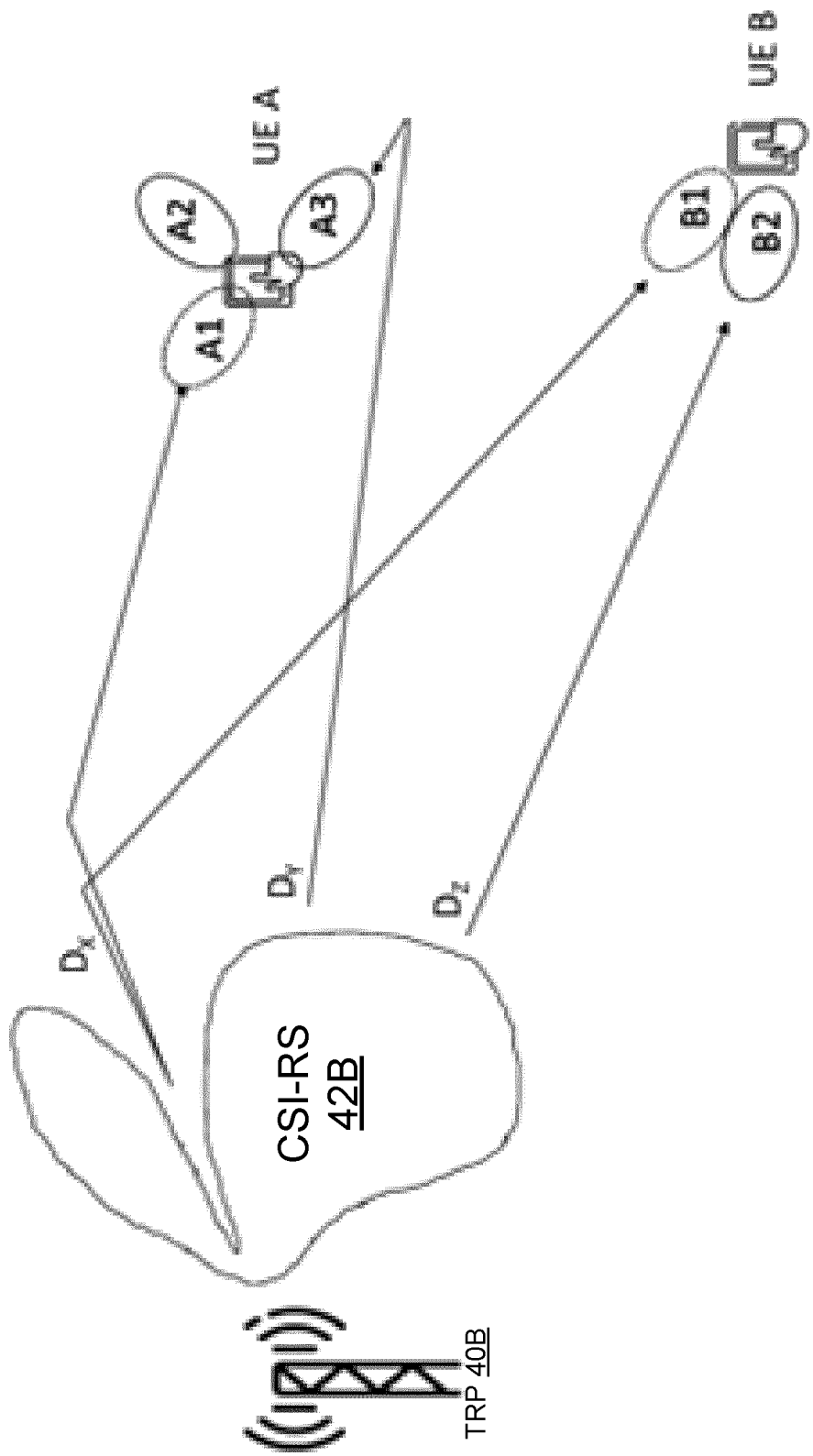
FIG. 5B is a block diagram of a TRP that precodes and transmits CSI-RS to account for inter-user interference according to some embodiments.

According to one or more embodiments as shown in FIG. 5B, however, TRP 40B generates a null for the CSI-RS 42B in the direction of Dx where both UEs have strong paths. Hence, in this case, it is more likely that UE A will generate UL precoders similar to beam A3 and that UE B will generate UL precoders similar to B2. In this case, the two UL transmissions from the two UEs will arrive from different directions at the TRP 40B (Dy and Dz) which makes the inter-user interference simpler to remove.

Figure 6:
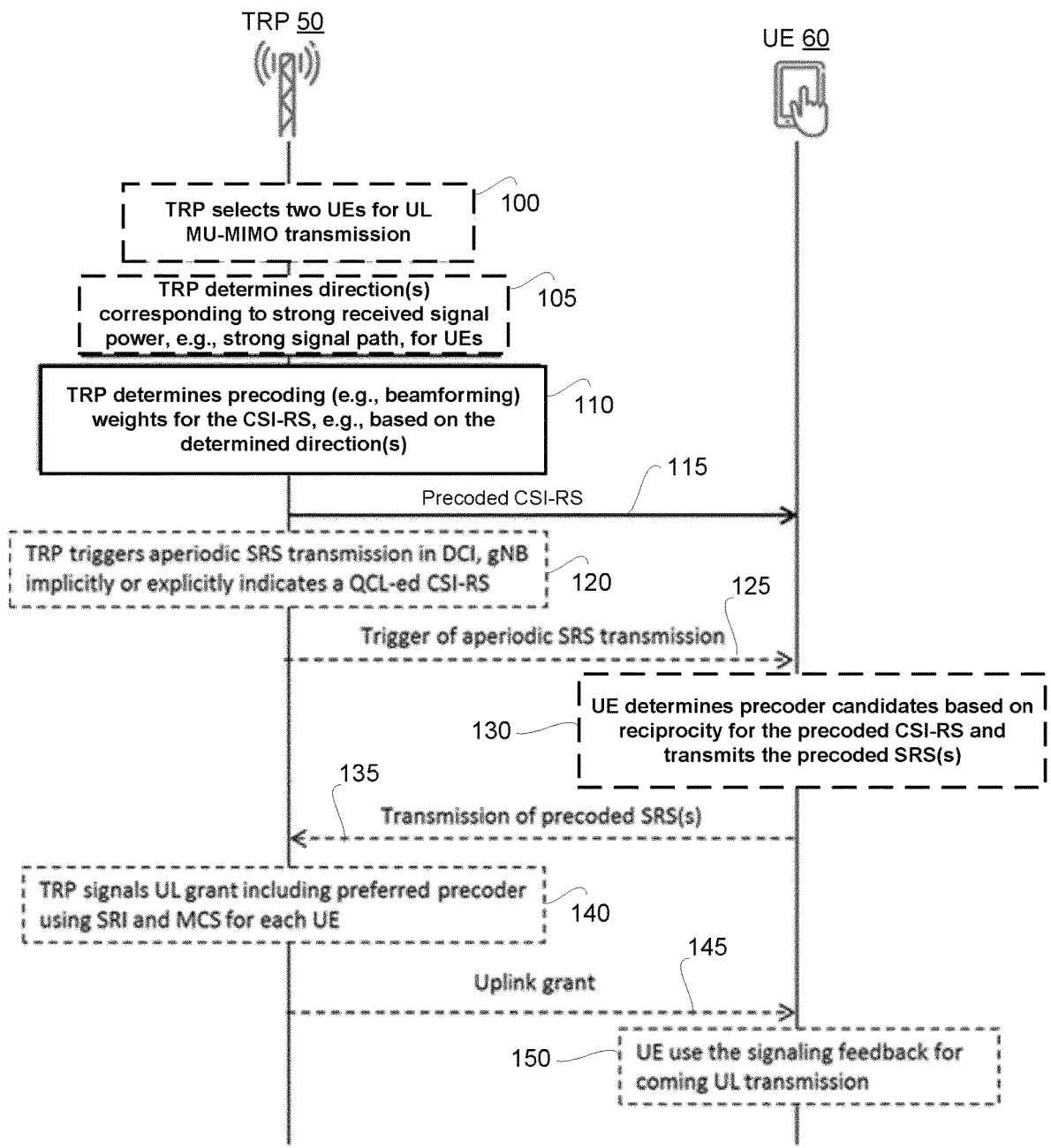
FIG. 6 is a call flow diagram for processing performed by a radio network node and UE according to some embodiments.

FIG. 6 illustrates one or more other embodiments of a method of UL MU-MIMO transmission herein. The method may be applicable for one or more UEs selected by the TRP 50 for UL MU-MIMO. In some embodiments, the method may be applicable for two or more UEs selected by the TRP for UL MU-MIMO. FIG. 6 shows one such UE 60 that is selected. In this regard, the method first includes the TRP 50 as shown selecting two UEs for UL MU-MIMO, including UE 60 (Block 100). In the next step, 105, the TRP 50 may determine one or more directions (e.g., directions of arrival, DOA) corresponding to a strong received signal power, e.g. a strong signal path, for the two UEs. For example, the TRP 50 may determine one or more directions corresponding to the strongest received signal power.

Based on the determined direction(s), the TRP 50 determines precoding (e.g., beamforming) weights for the CSI-RS transmission that will be used to sound the channel for the selected UEs (Block 110). The precoding weights may for instance be generated such that the mutual information for coming UL MU-MIMO transmissions is maximized, thereby considering the inter-user interference. One example of such precoding is to create a beam that nulls directions where both UEs have strong paths in order to minimize the risk that both UEs find precoders using that path. The TRP 50 then transmits 115 the precoded CSI-RS to the UEs.

In some embodiments, the TRP 50 triggers aperiodic SRS transmission from the UE 60, e.g., in DCI (Block 120) and sends such a trigger 125. Alternatively or additionally, the TRP 50 may implicitly or explicitly indicate a quasi co-location (QCL) assumption for the CSI-RS (Block 120).

In an embodiment, the UE 60 may use the CSI-RS to find a precoder for a precoded SRS transmission (Block 130) and transmit 135 the precoded SRS. The precoded SRS transmission may comprise one or multiple precoders, each precoder corresponding to one SRS resource. The TRP 50 may then determine one or multiple SRS resources and may signal back SRS resource indicators (SRIs) for the chosen SRS resources (Block 140) in an uplink grant 145. The SRI may be signaled back to the UE 60 together with a Modulation and Coding Scheme MCS to be used by the UE 60. The UE 60 may then apply UL precoding according to the selected SRIs and MCS for the coming UL transmissions (Block 150).

Embodiments herein may use any of one or more communication protocols known in the art or that may be developed, such as IEEE 802.xx, CDMA, WCDMA, GSM, LTE, UTRAN, WiMax, or the like. Accordingly, although sometimes described herein in the context of 5G, the principles and concepts discussed herein are applicable to 4G systems and others.

Note that a radio node herein is any type of node (e.g., a radio network node or wireless device) capable of communicating with another node over radio signals. A radio network node is any type of radio node within a wireless communication network, such as a base station. A network node is any type of node within a wireless communication network, whether a radio network node or not. A wireless device is any type of radio node capable of communicating with a radio network node over radio signals.

A wireless device may therefore refer to a user equipment (UE), a mobile station, a laptop, a smartphone, a machine-to-machine (M2M) device, a machine-type communications (MTC) device, a narrowband Internet of Things (IoT) device, etc. That said, although the wireless device may be referred to as a UE, it should be noted that the wireless device does not necessarily have a "user" in the sense of an individual person owning and/or operating the device. A wireless device may also be referred to as a wireless communication device, a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but may be generally configured to transmit and/or receive data without direct human interaction.

In an IoT scenario, a wireless device as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless communication device as described herein may be comprised in a vehicle and may perform monitoring and/or reporting of the vehicle's operational status or other functions associated with the vehicle.

Examples of radio network nodes include, but are not limited to, base stations (BSs), radio base stations, Node Bs, multi-standard radio (MSR) radio nodes such as MSR BSs, evolved Node Bs (eNBs), femto base stations, pico base stations, micro base stations, macro base stations, one or more (or all) parts of a distributed radio base station such as centralized digital units and/or remote radio units (which may or may not be integrated with an antenna as an antenna integrated radio), network controllers, radio network controllers (RNCs), base station controllers (BSCs), relay nodes, relay donor node controlling relays, base transceiver stations (BTSs), access points (APs), radio access points, transmission points, transmission nodes, Remote Radio Units (RRUs), Remote Radio Heads (RRHs), nodes in a distributed antenna system (DAS), Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, a radio network node may represent any suitable device (or group of devices) capable, configured, arranged, and/or operable to enable and/or provide a wireless device access to the wireless communication network or to provide some service to a wireless device that has accessed the wireless communication network. The list above is not intended to express just alternative radio network nodes, but to express various examples of classes of network equipment as well as examples of specific network equipment.

Figure 7:
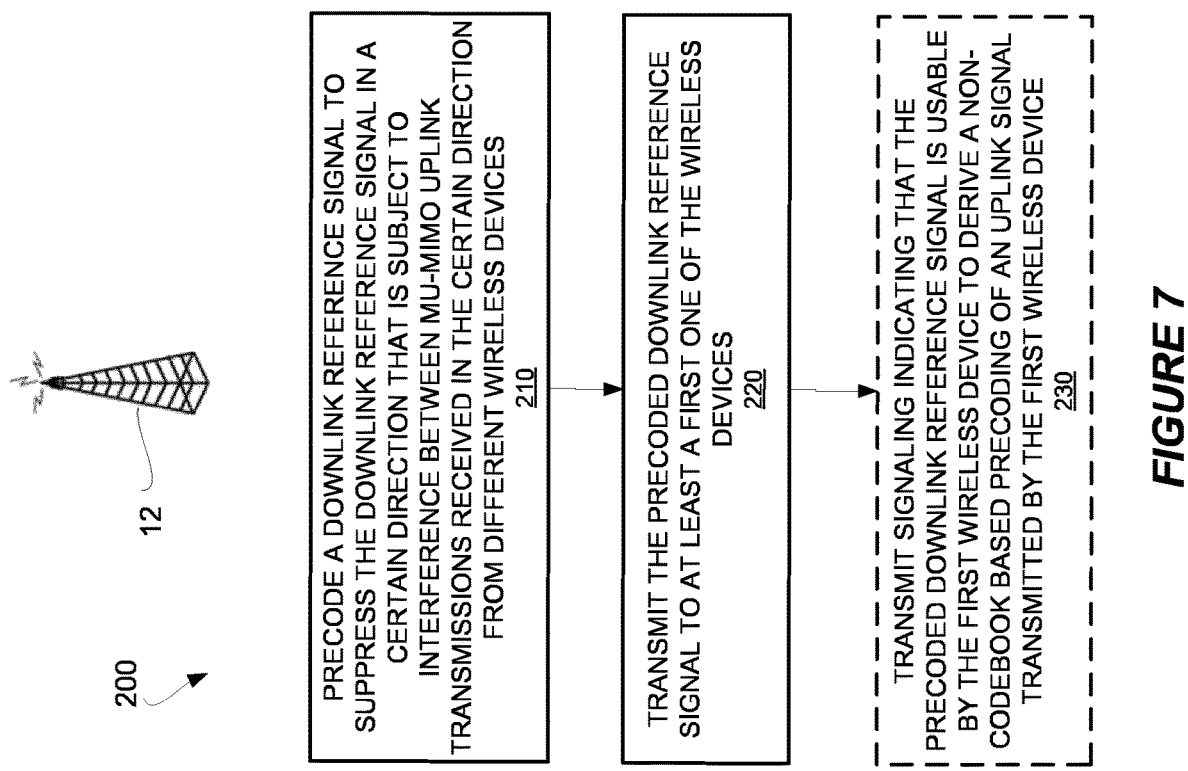
FIG. 7 is a logic flow diagram of a method performed by a radio network node according to some embodiments.

In view of the above modifications and variations, those skilled in the art will appreciate that FIG. 7 illustrates an example method performed by a radio network node 12 configured for use in a multi-user multiple-input multiple-output (MU-MIMO) wireless communication system 10. The method 200 includes precoding a downlink reference signal 22 to suppress the downlink reference signal 22 in a certain direction D1 that is subject to interference between MU-MIMO uplink transmissions received in the certain direction D1 from different wireless devices 14A, 14B (Block 210). The method 200 also includes transmitting the precoded downlink reference signal 22 to at least a first one 14A of the wireless devices (Block 220). In some embodiments, the method 200 further includes transmitting signaling 30 indicating that the precoded downlink reference signal 22 is usable by the first wireless device 14A to derive a non-codebook based precoding of an uplink signal transmitted by the first wireless device 14A (Block 230).

In some embodiments, for example, the method 200 may entail transmitting the precoded downlink reference signal 22 on a downlink antenna port. In one or more of these embodiments, the signaling 30 may indicate that the downlink antenna port is quasi co-located with an uplink antenna port on which a precoded uplink signal is transmittable by the first wireless device 14A.

Figure 8:
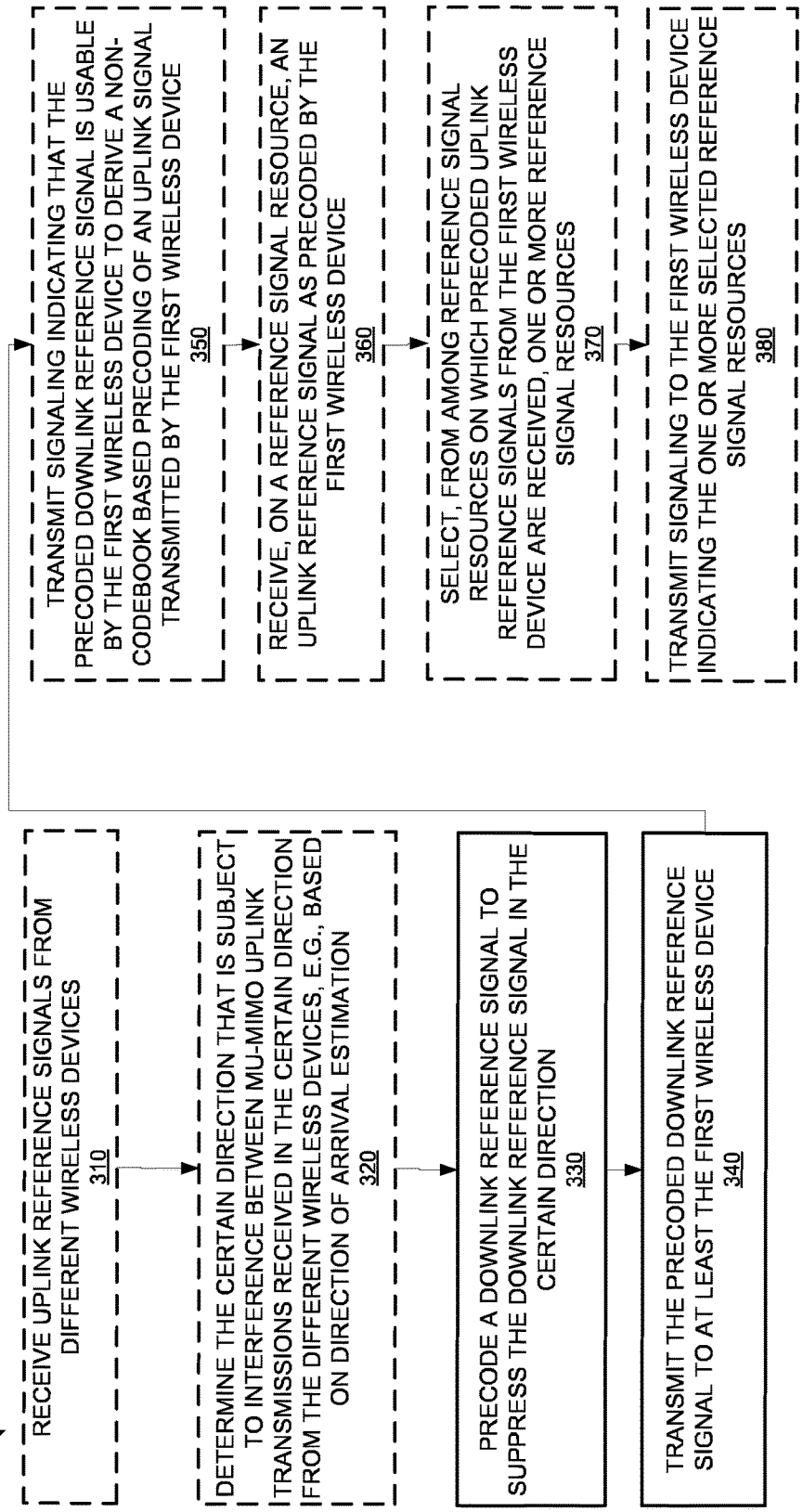
FIG. 8 is a logic flow diagram of a method performed by a radio network node according to other embodiments.

FIG. 8 illustrates additional details of a method 300 performed by the radio network node 12 in other embodiments. As shown, the method 300 may include receiving uplink reference signals from different wireless devices 14A, 14B. The method 300 may also include determining the certain direction D1 that is subject to interference between MU-MIMO uplink transmissions received in the certain direction D1 from different wireless devices 14A, 14B (Block 320). Such determination may for instance entail estimating respective directions of arrival of the uplink reference signals, and determining the certain direction D1 as being an estimated direction of arrival common to the different wireless devices. Regardless, the method 300 further includes precoding the downlink reference signal 22 to suppress the downlink reference signal 22 in the certain direction D1 (Block 330), and transmitting the precoded downlink reference signal 22 to at least a first one 14A of the wireless devices (Block 340). The method 300 may also include transmitting signaling 30 indicating that the precoded downlink reference signal 22 is usable by the first wireless device 14A to derive a non-codebook based precoding of an uplink signal transmitted by the first wireless device 14A (Block 350).

FIG. 8 also shows that the method 300, in some embodiments where the uplink signal is an uplink reference signal, further includes receiving, on a reference signal resource, the uplink reference signal as precoded by the first wireless device 14A (Block 360). The method 300 may further include selecting, from among reference signal resources on which precoded uplink reference signals from the first wireless device 14A are received, one or more reference signal resources (Block 370). The method 300 may then include transmitting signaling to the first wireless device 14A indicating the one or more selected reference signal resources (Block 380).

Note that a radio network node 12 as described above may perform the methods in FIGS. 6, 7, and/or 8 and any other processing herein by implementing any functional means or units. In one embodiment, for example, the radio network node 12 comprises respective circuits or circuitry configured to perform the steps shown in FIG. 6, 7, or 8. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

FIG. 9 illustrates the radio network node 12 as implemented in accordance with one or more embodiments. As shown, the radio network node 12 includes processing circuitry 300 and communication circuitry 310. The communication circuitry 310 (e.g., radio circuitry) is configured to transmit and/or receive information to and/or from one or more other nodes, e.g., via any communication technology. Such communication may occur via one or more antennas that are either internal or external to the radio network node 12. The processing circuitry 300 is configured to perform processing described above, e.g., in FIG. 6, 7, or 8, such as by executing instructions stored in memory 320. The processing circuitry 300 in this regard may implement certain functional means, units, or modules.

FIG. 10 illustrates the radio network node 12 as implemented in accordance with one or more other embodiments. As shown, the radio network node 12 implements various functional means, units, or modules, e.g., via the processing circuitry 300 in FIG. 9 and/or via software code. These functional means, units, or modules, e.g., for implementing the method in FIG. 7, include for instance a precoding unit or module 400 for precoding a downlink reference signal 22 to suppress the downlink reference signal 22 in a certain direction D1 that is subject to interference between MU-MIMO uplink transmissions received in the certain direction from different wireless devices 14A, 14B. Also included is a transmitting unit or module 410 for transmitting the precoded downlink reference signal 22 to at least a first one 14A of the wireless devices. The transmitting unit or module 410 in some embodiments may also be for transmitting signaling 30 indicating that the precoded downlink reference signal 22 is usable by the first wireless device 14A to derive a non-codebook based precoding of an uplink signal transmitted by the first wireless device 14A.

Those skilled in the art will also appreciate that embodiments herein further include corresponding computer programs.

A computer program comprises instructions which, when executed on at least one processor of the radio network node 12, cause the radio network node 12 to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of a radio network node 12, cause the radio network node 12 to perform as described above.

Embodiments further include a computer program product comprising program code portions for performing the steps of any of the embodiments herein when the computer program product is executed by a computing device. This computer program product may be stored on a computer readable recording medium.

What is claimed is:

1. A method performed by a radio network node configured for use in a multi-user multiple-input multiple-output (MU-MIMO) wireless communication system, the method comprising:
   precoding a downlink reference signal to suppress the downlink reference signal in a certain direction that is subject to interference between MU-MIMO uplink transmissions received in the certain direction from different wireless devices;
   transmitting the precoded downlink reference signal to at least a first one of the wireless devices; and
   transmitting signaling indicating that the precoded downlink reference signal is usable by the first wireless device to derive a non-codebook based precoding of an uplink signal transmitted by the first wireless device.

2. The method of claim 1, comprising transmitting the precoded downlink reference signal on a downlink antenna port and wherein the signaling indicates that the downlink antenna port is quasi co-located with an uplink antenna port on which a precoded uplink signal is transmittable by the first wireless device.

3. The method of claim 1, wherein the uplink signal is an uplink reference signal, and wherein the method further comprises:
   receiving, on a reference signal resource, the uplink reference signal as precoded by the first wireless device;
   selecting, from among reference signal resources on which precoded uplink reference signals from the first wireless device are received, one or more reference signal resources; and
   transmitting signaling to the first wireless device indicating the one or more selected reference signal resources.

4. The method of claim 1, wherein said precoding comprises precoding the downlink reference signal to be transmitted on a beam that has a null in the certain direction.

5. The method of claim 1, wherein said precoding comprises precoding the downlink reference signal to be transmitted on one or more orthogonal beams that excludes a beam pointing in the certain direction, wherein the method further comprises mapping the certain direction to an orthogonal beam in a set of multiple orthogonal beams and determining the one or more orthogonal beams on which the downlink reference signal is to be transmitted as excluding the orthogonal beam to which the certain direction is mapped.

6. The method of claim 1, further comprising receiving uplink reference signals from the different wireless devices, estimating respective directions of arrival of the uplink reference signals, and determining the certain direction as being an estimated direction of arrival common to the different wireless devices.

7. The method of claim 6, wherein the uplink reference signals are non-precoded uplink reference signals.

8. The method of claim 6, wherein the uplink reference signals are sounding reference signals.

9. The method of claim 6, wherein estimating respective directions of arrival of the uplink reference signals comprises estimating respective directions of arrival of the uplink reference signals associated with the strongest received power.

10. The method of claim 1, further comprising calculating respective covariance matrices for the different wireless devices and determining the certain direction from the calculated covariance matrices.

11. The method of claim 1, further comprising receiving uplink reference signals from the different wireless devices and determining precoding weights for precoding the downlink reference signal, based on explicit uplink channel estimates obtained from the uplink reference signals, wherein determining the precoding weights comprises performing a regularized inverse of the sum of instantaneous channel correlation of channels of the wireless devices.

12. The method of claim 1, wherein the downlink reference signal is a channel state information reference signal, CSI-RS.

13. The method of claim 1, comprising transmitting the downlink reference signal to each of the wireless devices on a downlink antenna port, and transmitting signaling indicating that the downlink antenna port is quasi co-located with an uplink antenna port of each of the wireless devices.

14. The method of claim 1, wherein the MU-MIMO wireless communication system is a time division duplex (TDD) system.

15. A radio network node configured for use in a multi-user multiple-input multiple-output (MU-MIMO) wireless communication system, the radio network node comprising communication circuitry and processing circuitry whereby the radio network node is configured to:
   precode a downlink reference signal to suppress the downlink reference signal in a certain direction that is subject to interference between MU-MIMO uplink transmissions received in the certain direction from different wireless devices;
   transmit, via the communication circuitry, the precoded downlink reference signal to at least a first one of the wireless devices; and
   transmit, via the communication circuitry, signaling indicating that the precoded downlink reference signal is usable by the first wireless device to derive a non-codebook based precoding of an uplink reference signal transmitted by the first wireless device.

16. The radio network node of claim 15, whereby the radio network node is configured to:
   transmit, via the communication circuitry, the precoded downlink reference signal on a downlink antenna port and wherein the signaling indicates that the downlink antenna port is quasi co-located with an uplink antenna port on which a precoded uplink signal is transmittable by the first wireless device.

17. The radio network node of claim 15, wherein the uplink signal is an uplink reference signal, and whereby the radio network node is configured to:

receive, via the communication circuitry and on a reference signal resource, the uplink reference signal as precoded by the first wireless device;

select, from among reference signal resources on which precoded uplink reference signals from the first wireless device are received, one or more reference signal resources; and transmit, via the communication circuitry, signaling to the first wireless device indicating the one or more selected reference signal resources.

18. The radio network node of claim 15, whereby the radio network node is configured to precode the downlink reference signal to be transmitted on a beam that has a null in the certain direction.

19. The radio network node of claim 15, whereby the radio network node is configured to:

precode the downlink reference signal to be transmitted on one or more orthogonal beams that excludes a beam pointing in the certain direction;

map the certain direction to an orthogonal beam in a set of multiple orthogonal beams; and determine the one or more orthogonal beams on which the downlink reference signal is to be transmitted as excluding the orthogonal beam to which the certain direction is mapped.

20. A non-transitory computer-readable medium on which is stored instructions that, when executed by a processor of a radio network node configured for use in a multi-user multiple-input multiple-output (MU-MIMO) wireless communication system, causes the radio network node to:

precode a downlink reference signal to suppress the downlink reference signal in a certain direction that is subject to interference between MU-MIMO uplink transmissions received in the certain direction from different wireless devices;

transmit the precoded downlink reference signal to at least a first one of the wireless devices; and transmit signaling indicating that the precoded downlink reference signal is usable by the first wireless device to derive a non-codebook based precoding of an uplink signal transmitted by the first wireless device.

* * * * *